United States Patent
Wu

(10) Patent No.: US 7,982,979 B2
(45) Date of Patent: Jul. 19, 2011

(54) LENS MODULE

(75) Inventor: Cheng-Shiun Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/761,416

(22) Filed: Apr. 16, 2010

(65) Prior Publication Data

US 2011/0149419 A1    Jun. 23, 2011

(30) Foreign Application Priority Data

Dec. 21, 2009    (TW) .................................. 98144014

(51) Int. Cl.
*G02B 7/02* (2006.01)
(52) U.S. Cl. ........................................ 359/819; 359/811
(58) Field of Classification Search .................. 359/811, 359/812, 813, 814, 815, 817, 818, 819
See application file for complete search history.

(56) References Cited

U.S. PATENT DOCUMENTS 4,763,334 A * 8/1988 Shimada et al. ......... 372/29.014
6,072,634 A * 6/2000 Broome et al. ............... 359/637

* cited by examiner

*Primary Examiner* — Timothy J Thompson
(74) *Attorney, Agent, or Firm* — Zhigang Ma

(57) ABSTRACT

A lens module includes a lens and an opaque plate. The lens is received in the main body, and includes an imaging portion and a non-imaging portion surrounding the imaging portion. An annular flange is extended upward from the image-side surface of the non-imaging portion. The flange and the image-side surface defines a receiving groove. The opaque plate includes a circular opening corresponding to the imaging portion and a lightproof solid body surrounding the opening. The opaque plate is disposed on the image-side surface of non-imaging portion of the lens with the lightproof solid body received in the receiving groove.

12 Claims, 2 Drawing Sheets

LENS MODULE

BACKGROUND

1. Technical Field

The present embodiment relates to a lens module.

2. Description of Related Art

Opaque plates are used in lens modules for blocking off-axis light rays entering the lens modules. Such an opaque plate is typically a thin, annular plate and can be assembled to the lens module via being held by a lens barrel of the lens module and sandwiched by two adjacent lenses of the lens module. However, it is precision-demanded work to make the opaque plate fittingly engaged with the lenses. Often the precision is low and the quality is thus affected.

Therefore, it is desirable to provide a lens module which can overcome the above-mentioned problems.

BRIEF DESCRIPTION OF THE DRAWINGS

Many aspects of the present lens module can be better understood with reference to the accompanying drawings. The components in the drawings are not necessarily drawn to scale, the emphasis instead being placed upon clearly illustrating the principles of the present lens module. Moreover, in the drawings, like reference numerals designate corresponding parts throughout the several views, and all the views are schematic.

DETAILED DESCRIPTION

Embodiments of the present lens module will now be described in detail below and with reference to the drawings.

Figure 1:
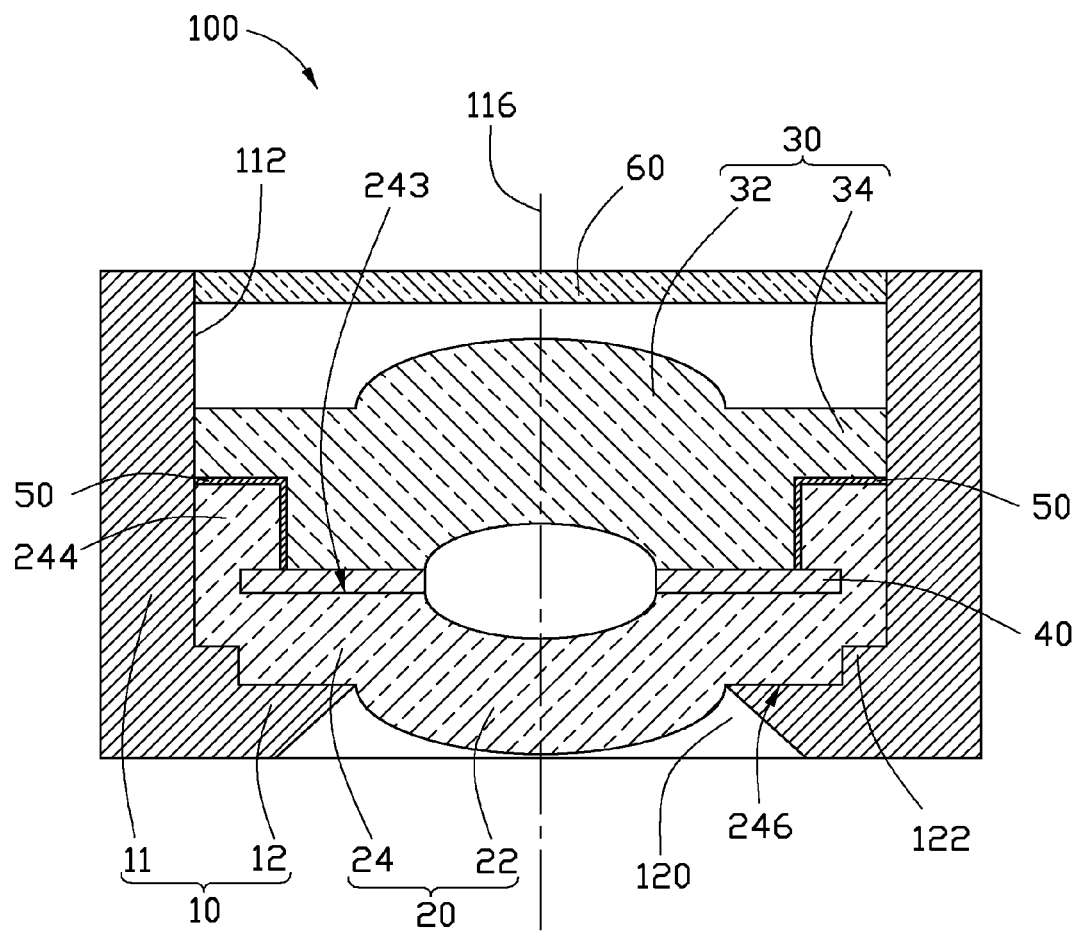
FIG. 1 is a cross-sectional and schematic view of a lens module according to an exemplary embodiment.
Figure 2:
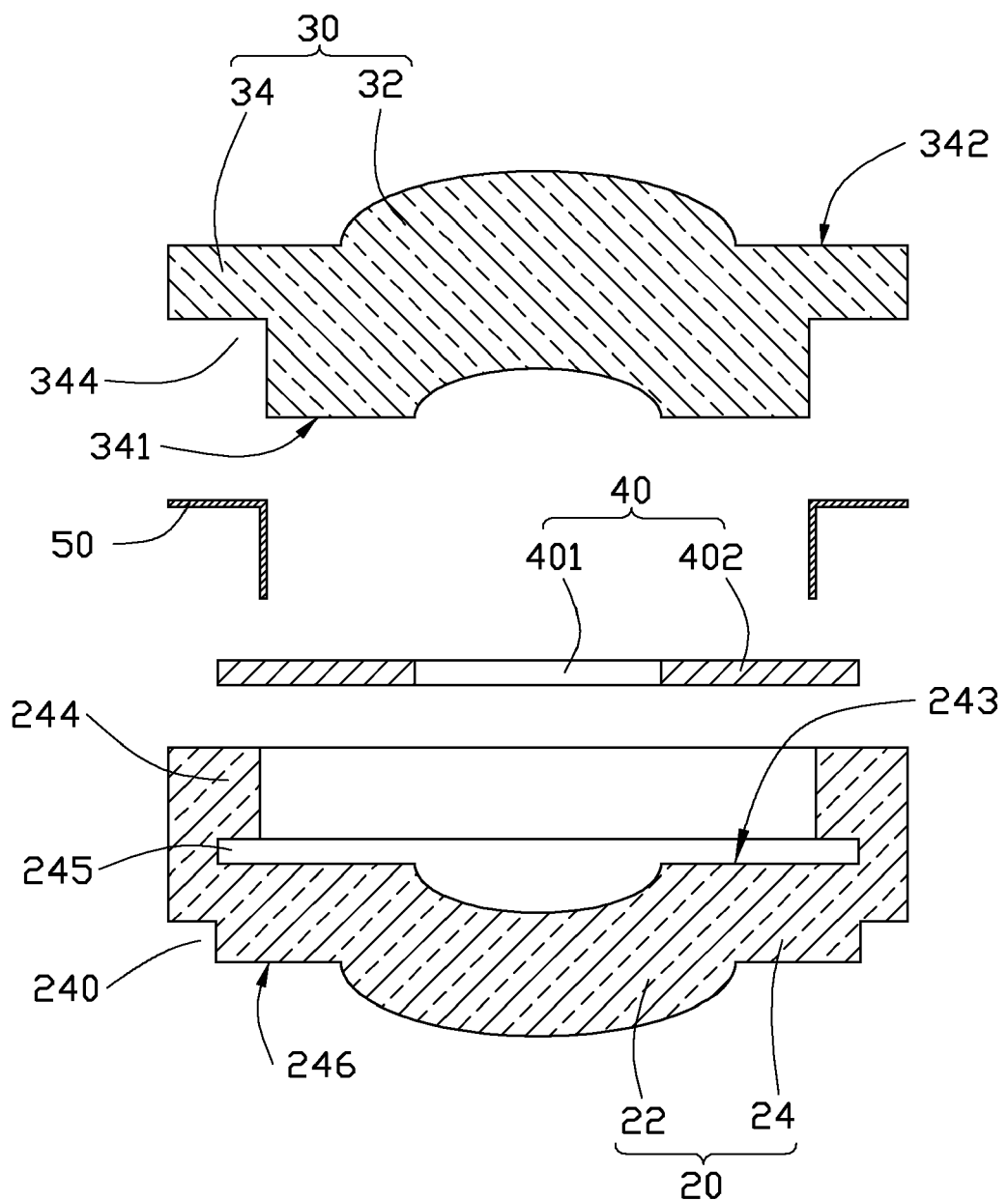
FIG. 2 is an exploded, cross-sectional view of the lens module of FIG. 1, with a lens barrel omitted.

Referring to FIGS. 1-2, a lens module 100, according to an exemplary embodiment, includes a lens barrel 10, a first lens 20, an opaque plate 40, a second lens 30, and an IR filter 60. The first lens 20, the opaque plate 40, the second lens 30, and the IR filter 60 are received in the barrel 10 in the order from the object-side to the image-side of the lens module 100. The lens module 100 defines an optical axis 116.

The lens barrel 10 is a hollow cylinder in shape and includes a main body 11 and an annular aperture plate 12. The annular aperture plate 12 is positioned at the object-side end of the main body 11 and is integrally formed with the main body 11. The annular aperture plate 12 defines an aperture opening 120 at the center thereof to allow light rays from an object of interest (not shown) to enter the lens barrel 10. In particular, the aperture opening 120 tapers towards the image-side of the lens barrel 10, which is beneficial for controlling the angle of incident of the light rays entering thereunto. The main body 11 includes an inner sidewall 112. The inner sidewall 112 can efficiently absorb light rays incident thereupon to improve image quality of the lens module 100. In the present embodiment, an annular bulged portion 122 bulges upward along the periphery of inner surface of the annular aperture plate 12 and is integrally formed with the annular aperture plate 12.

The first lens 20 can be made of plastic or glass. In the present embodiment, the first lens 20 is made of plastic. The first lens 20 includes an imaging portion 22 and a non-imaging portion 24. The imaging portion 22 is convex facing toward the aperture opening 120, and is configured for refracting light rays from an object and allowing them to pass to the second lens 40. The non-imaging portion 24 surrounds the imaging portion 22 and is configured for fixing to the inner sidewall 112 of the lens barrel 10. An annular first cutout 240 is defined along the periphery of the object-side surface 246 of the non-imaging portion 24 and is shaped corresponding to the bulged portion 122 of the lens barrel 10 so as to locate the first lens 20 onto the inner surface of the annular aperture plate 12. An annular flange 244 perpendicularly extends upward from the periphery of the image-side surface 241 of the non-imaging portion 24. A junction of the inner surface of the flange 244 and the image-side surface 243 defines an annular receiving groove 245 for receiving the opaque plate 40. The receiving groove 245 is larger in diameter than the inner diameter of the flange 244.

It is noteworthy that, in alternative embodiments, the first cutout 240 of the first lens 20 and the bulged portion 122 of the lens barrel 10 may be omitted, the first lens 20 is held and fixed by the inner sidewall of the annular aperture plate 12 by adhesive, welding (e.g., plastic welding), or other attaching methods.

The second lens 30 can be also made of plastic or glass, and includes an imaging portion 32 and a non-imaging portion 34. In the present embodiment, the second lens 30 is made of plastic. The imaging portion 32 is concave facing away from the first lens 20, and can be spherical or aspherical. The imaging portion 32 is configured for refracting light rays from first lens 20 and cooperating with the image portion 22 of the first lens 20 to form images of an object. The non-imaging portion 34 surrounds the imaging portion 32, and is configured for fixing to the inner sidewall 112 of the lens barrel 10. An annular second cutout 344 is defined along the periphery of the object-side surface 341 of the non-imaging portion 34, corresponding to the flange 244 of the first lens 20. Upon assembly, the flange 244 abuts with the second cutout 344, which can improve assembly accuracy.

It is noteworthy that the flange 244 of the first lens 20 and the second cutout 344 of the second lens 30 improve the positioning accuracy between the first lens 20 and the second lens 30. As a result, the optical axes of the first lens 20 and the second lens 30 are aligned for forming the optical axis 116 of the lens module 100 to improve performance of the lens module 100.

The opaque plate 40 is ring-shaped and is made of an elastic opaque material, such as polyethylene terephthalate (PET) or poly carbonate (PC), to block light rays transmitted in the non-imaging portion 24 of the first lens 20. In the present embodiment, the opaque plate 40 is made of PET. The opaque plate 40 is annular and defines a circular opening 401 corresponding to the imaging portion 22 of the first lens 20 and a lightproof solid body 402 surrounding the circular opening 401. During assembly, the opaque plate 40 is squeezed inwardly and pushed downward along the passage defined by the flange 244 of the first lens 20 until the outer periphery of the lightproof solid body 402 is released and is fittingly received in the receiving groove 245. Of course, it is noteworthy that the thickness of the opaque plate 40 along the direction of the optical axis 116 is substantially equal to or slightly smaller than that of the receiving groove 245, to prevent the opaque plate 40 from swaying in the receiving groove 245.

The lens module 100 further includes an opaque film 50. The opaque film 50 is annular in shape and interleaved between the flange 244 of the first lens 20 and the second cutout 344 of the second lens 30 for blocks light rays passing through the non-imaging portions of the first lens 20 and the second lens 40, thereby improving the image quality of the lens module 100.

The IR filter 60 is disposed in the lens barrel 10 and is configured for filtering light from the first lens 20 and second lens 30.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A lens module comprising:
   a lens comprising an imaging portion and a non-imaging portion surrounding the imaging portion, an annular flange extended upward from the image-side surface of the non-imaging portion, a junction of the inner surface of the flange and the image-side surface defining an annular receiving groove; and
   an opaque plate, made of elastic opaque material, comprising a circular opening corresponding to the imaging portion and a lightproof solid body surrounding the opening, the opaque plate being disposed on the image-side surface of non-imaging portion of the lens, wherein, during assembly, the opaque plate is squeezed inwardly and pushed downward along the passage defined by the flange of the lens until the outer periphery of the lightproof solid body is released and is fittingly received in the receiving groove.

2. The lens module of claim 1, further comprising a lens barrel, wherein the lens barrel comprises a lens barrel comprising a main body with an inner sidewall and an annular aperture plate positioned at the object-side end of the main body, the annular aperture plate defines an opening at the center thereof to allow light rays from an object entering the lens barrel.

3. The lens module of claim 2, wherein the aperture opening of the lens barrel tapers towards the image-side of the lens barrel.

4. The lens module of claim 2, wherein an annular bulged portion bulges upward along the periphery of the inner surface of the annular, an annular cutout is defined along the periphery of the object-side surface of the non-imaging portion and is shaped corresponding to the bulged portion of the lens barrel so as to locate the lens onto the inner surface of the annular aperture plate.

5. The lens module of claim 1, wherein the receiving groove is larger in diameter than the inner diameter of the flange, the thickness of the opaque plate along the direction of the optical axis of the lens module is substantially equal to or slightly smaller than that of the receiving groove.

6. The lens module of claim 1, wherein the receiving groove is defined in a junction of the inner surface of the flange and the image-side surface.

7. A lens module, comprising:
   a lens barrel comprising a main body with an inner sidewall;
   a first lens received in the main body and comprising an imaging portion and a non-imaging portion surrounding the imaging portion, an annular flange extended upward from the image-side surface of the non-imaging portion, a junction of the inner surface of the flange and the image-side surface defining a receiving groove;
   an opaque plate made of elastic opaque material, comprising a circular opening corresponding to the imaging portion of the first lens and a lightproof solid body surrounding the opening, the opaque plate being disposed on the image-side surface of non-imaging portion of the lens; and
   a second lens comprising an imaging portion and a non-imaging portion surrounding the imaging portion, an annular second cutout defined along the periphery of the object-side surface of the non-imaging portion of the second lens corresponding to the flange of the first lens, the second lens disposed on the image-side surface of the first lens with the flange abutting with the second cutout, wherein, during assembly, the opaque plate is squeezed inwardly and pushed downward along the passage defined by the flange of the first lens until the outer periphery of the lightproof solid body is released and is fittingly received in the receiving groove.

8. The lens module of claim 7, wherein the lens barrel further comprises an annular aperture plate positioned at the object-side end of the main body, the annular aperture plate defines an aperture opening at the center thereof to allow light rays from an object entering the lens barrel.

9. The lens module of claim 8, wherein the aperture opening tapers towards the image-side of the lens barrel.

10. The lens module of claim 8, wherein an annular bulged portion bulges upward along the periphery of the inner surface of the annular, an annular cutout is defined along the periphery of the object-side surface of the non-imaging portion and is shaped corresponding to the bulged portion of the lens barrel so as to locate the lens onto the inner surface of the annular aperture plate.

11. The lens module of claim 7, wherein the receiving groove is larger in diameter than the inner diameter of the flange, the thickness of the opaque plate along the direction of the optical axis of the lens module is substantially equal to or slightly smaller than that of the receiving groove.

12. The lens module of claim 7, further comprising an opaque film, wherein the opaque film is annular in shape and interleaved between the flange of the first lens and the second cutout of the second lens.

\* \* \* \* \*